United States Patent [19]
Sobotta

[11] 3,825,334
[45] July 23, 1974

[54] FEEDING MECHANISM FOR SLIDE MAGAZINES OF PICTURE PROJECTORS

[75] Inventor: Reinhard Sobotta, Mascherode, Germany

[73] Assignee: Rollei-Werke Franke & Heidecke, Braunschweig, Germany

[22] Filed: Aug. 8, 1972

[21] Appl. No.: 278,765

[30] Foreign Application Priority Data
Aug. 13, 1971 Germany............................ 2140600

[52] U.S. Cl................................. 353/103, 353/117
[51] Int. Cl....................... G03b 23/04, G03b 23/06
[58] Field of Search ........... 353/103, 105, 106, 107, 353/114–117

[56] References Cited
UNITED STATES PATENTS

| | | | |
|---|---|---|---|
| 3,110,120 | 11/1963 | Danner | 353/116 |
| 3,209,647 | 10/1965 | Hall | 353/117 |
| 3,216,138 | 11/1965 | Walter | 353/116 |
| 3,690,186 | 9/1972 | Fleissner | 353/103 |

Primary Examiner—Louis R. Prince
Assistant Examiner—A. Jason Mirabite
Attorney, Agent, or Firm—Stonebraker & Shepard

[57] ABSTRACT

Mechanism for feeding picture slide magazines of a photographic projector. The projector is provided with a guideway or track along which a bar-type slide magazine moves approximately horizontally parallel to the optical axis, and the projector has a claw mechanism for engaging a rack along the side of the bar-type magazine, to move it step by step so that one picture slide after another is brought into position to be shifted laterally from the magazine into alignment with the optical axis of the projector, for projection purposes. The present invention provides a housing for holding a slide magazine of circular or ring form, adapted to be placed in the same track in which a bar-type magazine may be mounted. A pinion for engaging a rack on the circular magazine is carried by the housing and is operated, through a slide, from the same feeding claw which is adapted to feed a magazine of the bar-type, when such a magazine is used.

7 Claims, 3 Drawing Figures

FEEDING MECHANISM FOR SLIDE MAGAZINES OF PICTURE PROJECTORS

BACKGROUND OF THE INVENTION

Two general types of magazines for photographic slide projectors are known in the art. One is a straight magazine, longitudinally extended, the individual picture slides being mounted crosswise in the magazine. The projector has a track or guideway, extending horizontally parallel to and at one side of the optical axis, and the magazine is placed in this track or guideway and is fed step by step, forwardly or backwardly, to bring one slide after another successively into a position where the projector mechanism will transfer a slide from the magazine to the optical axis of the projector for projection purposes, and then, when projection of this particular slide is completed, will transfer the slide back into the magazine, feed the magazine longitudinally through one step or increment, and then shift the next slide to the optical axis for projection.

The other main type of slide magazine is a circular magazine or ring shaped magazine. In one very popular type of projector, the circular magazine is mounted on the top of the projector, and rotates step by step in an approximately horizontal plane. In another known type of projector, the circular magazine lies in what may be called an "on edge" position, with the magazine in a vertical plane parallel to and offset to one side of the optical axis.

The present invention deals with a projector which will operate with either a bar type or the ring type of magazine. The projector is provided with the usual elongated track or guideway, arranged horizontally parallel to the optical axis, for receiving a conventional bar type of magazine. The projector has a claw mechanism for engaging a rack on the side of the bar magazine, to advance the magazine step by step to bring successive picture slides into alignment with the shifting or transfer mechanism which moves a slide from the magazine to the optical axis and then back to the magazine. According to the present invention, this same longitudinal track which normally receives a magazine of the bar type, is adapted also to receive, when desired, a magazine of the circular or ring type.

To enable the circular or ring magazine to be fed step by step from the same feeding claw mechanism which normally feeds a magazine of the bar type, and yet at the same time to enable the designer to design the circular magazine with a feeding rack in whatever location the designer thinks most suitable, rather than requiring the rack to be in a location which will be engaged directly by the feeding claw, the present invention provides a housing or casing for containing the circular magazine, the housing being adapted to be placed in the same track or guideway in which a magazine of the bar type is placed, when such a magazine is used. The housing for the circular magazine remains stationary in the track during operation of the projector, and the circular or ring magazine itself rotates within the housing as the feeding mechanism operates. The housing carries a feed pinion meshing with rack teeth on the circular magazine, so the designer can design the magazine with the feeding rack in a location remote from the feeding claw of the projector, since the rack does not have to mesh with the feeding claw but only with the feed pinion which is, of course, designed to mesh with it. When the feeding claw is operated, just as it would be if a magazine of the bar type were in the track instead of a magazine of the circular type, the motion of the feeding claw operates a slide which, in turn, turns the feeding pinion step by step, thereby advancing the magazine step by step in a rotary direction while the housing of the circular magazine remains stationary.

An important object of the invention, therefore, is to provide a relatively simple, sturdy, and inexpensive construction enabling both bar magazines and circular magazines to be used with the same projector.

Another object is to provide simple and satisfactory feeding mechanism whereby a circular magazine may be fed step by step by the motion of a feeding claw or gripper, even though the pitch of the feeding rack or teeth on the circular magazine may be different from the pitch of the rack on a bar type magazine for which the feeding claw or gripper is designed.

Still another object is the provision of feeding mechanism in which a slider is provided for transferring motion from a feeding claw or gripper to a feeding pinion, and in which this slider, in one extreme or limit position, engages the feeding rack teeth on the circular magazine, to hold the magazine positively against accidental rotation.

A further object is the provision of blocking means to insure that, while the circular magazine is being transported, the picture slides will not fall out through the opening through which the slides are individually transported from the magazine to projection position, such blocking means being automatically shifted to an ineffective position when the circular magazine and its housing are inserted in proper position in the track or guideway of the projector.

DESCRIPTION OF THE PREFERRED EMBODIMENT

Figure 1:
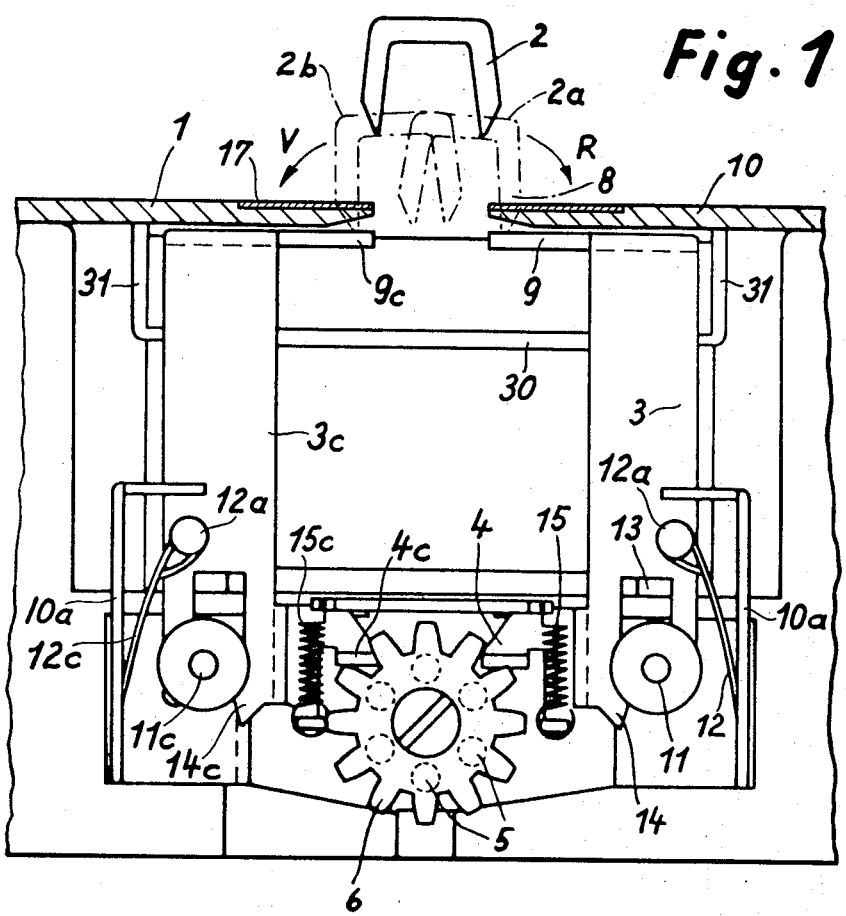
FIG. 1 is a fragmentary view, partly in plan and partly in horizontal section, illustrating the feeding mechanism carried by the housing of the circular magazine, for feeding the circular magazine from the feeding claw or gripper which feeds a magazine of the bar type, the sectional portion of this view being taken approximately on the line 1—1 of FIG. 2.

Referring first to FIG. 1, a fragment of the housing or casing for containing the picture slide magazine of circular or ring form, is shown at 10. The portion which is illustrated is the bottom portion of the housing, and is adapted to be laid in the conventional horizontal guideway or track of the photographic projector, which guideway or track will receive a picture slide magazine of the bar type or straight longitudinal type, as well as receiving the lower part of the circular housing for containing the circular magazine. When properly mounted in the magazine guideway or track, the circular housing and its circular magazine are upright or on edge, with the general plane of the housing and the contained magazine lying in a vertical plane parallel to the optical axis of the projector. The projector itself is not illustrated, except for the feeding claw or gripper, which is partially shown at 2.

In the particular type of projector with which it is preferred to use the present invention, the feeding claw or gripper 2 moves horizontally from the position shown in full lines in FIG. 1, obliquely to one or the other of the positions shown in broken lines at 2a and 2b. When the projector is used in the normal way, with a bar type slide magazine in the guideway, the oblique motion of the gripper 2 will engage a feeding rack extending longitudinally along the side wall of the magazine near the bottom thereof, on that side which faces the optical axis, and will move the magazine one step or increment forwardly or backwardly, as the case may be, depending upon whether the motion of the claw is obliquely forwardly or obliquely backwardly. But when the present housing for a circular magazine is placed in the magazine trough or guideway, instead of a bar type magazine, then one tooth of the claw 2 will move obliquely against a lateral lug or contact surface 9 at one end of a slider member 3, while the other tooth of the claw enters freely into an open space.

The magazine feeding slider 3 is mounted in the housing 10, for horizontal sliding movement in a direction toward and away from the optical axis, being guided in any suitable way such as by grooves or recesses formed in stationary members 30 and 31 near the inner end of the slider 3; that is, the end closer to the optical axis. The opposite or outer end of the slider 3 is guided on a stationary guide pin 11 extending through a wide slot 13 in the slider 3, the slot being wider than the diameter of the pin, so that this end of the slider may move laterally to a limited extent.

This end of the slider (the end remote form the optical axis) has a lateral lug 4 adapted to engage feed pins 5 projecting downwardly from the lower face of a horizontally arranged feed pinion 6 which is rotatable on a fixed pivot within the housing 10. The teeth of the magazine feed pinion 6, in turn, mesh with rack teeth 7 (see FIG. 2) forming a circular rack on the ring-shaped magazine 1 which rotates step by step within the magazine housing 10.

It has been mentioned that the slot 13 in the feeding slider 3 is wider than the guide pin 11 (although narrower than the enlarged head on the guide pin) so that this end of the slider 3 is capable of a limited motion laterally, toward and away from the center of the pinion 6. A light spring 12, fixed to a pin 12a carried by the slider 3, bears against a stationary partition 10a in the housing 10, and the reaction of this spring tends to move the end of the slider 3 toward the pinion 6, so as to keep the lug 4 in alignment with the pins 5 on the bottom of the pinion 6, in driving relation thereto. However, when the point 8 of the feeding claw 2 moves away from the portion 9 of the slider 3, a restoring spring 15 pulls the slider back (toward the optical axis) and the spring 12 yields, allowing the lug 4 and the corresponding end of the slider 3 to move a little to the right when viewed as in FIG. 1, to ratchet over the drive pins 5 during the back stroke, without turning the pinion 6.

At the end of the forward stroke of the magazine feeding mechanism, when the point 8 of the claw 2 comes against the lug 9 on the slider 3 and pushes the slider horizontally (in a downward direction when viewed as in FIG. 1), at the end of the feeding stroke a point of projection 14 on the slider 3 comes into engagement with an inter-tooth space in the same rack 7 which is engaged by the pinion 6, and thus stops the motion of the rack, holding the rotary magazine stationary for a short interval, long enough to prevent any tendency of the rotary magazine to overrun (i.e., to move more than the required single increment) as a result of the inertia or momentum acquired by the magazine during its single-step movement. Then during the return stroke of the feeding mechanism, while the feeding claw 2 moves back toward the optical axis (upwardly when viewed as in FIG. 1) the lug 4 on the slider 3 ratchets over the pins 5 of the pinion 6, as above mentioned, and the tooth 14 is simultaneously withdrawn from the rack teeth 7 of the magazine, no longer locking the magazine, but at this time the inertia of the magazine, which is now stationary, tends to keep it stationary until sufficient displacing force is applied during the next stroke, and so no movement of the magazine occurs during this return stroke of the slider 3 or the feeding claw 2. It is during this return stroke of the feeding claw 2 that the fresh slide is removed from the magazine and transported into the optical axis, by the slide transfer mechanism.

The action has been described with reference to the parts near the right hand side of FIG. 1. These parts are duplicated, in reverse or mirror image, near the left hand side of FIG. 1, bearing the same reference numerals with the addition of the letter c to each. This is to enable feeding motion of the slide magazine in the opposite direction. When the feeding claw or gripper moves obliquely to the right, in the general direction of the arrow R, the point 8 of the claw engages the lug 9 and moves the slider 3 through the feeding stroke to turn the pinion 6 in one direction as above explained. On the other hand, if the feeding claw 2 moves obliquely to the left, approximately as shown by the arrow V, then the other point 8c engages the lug 9c of the slider 3c, and the lug 4c on the slider is effective to turn the feeding pinion 6 in the opposite direction.

The action is the same, except for the direction of movement of the slide magazine, regardless of whether the feeding claw moves in the oblique direction V or in the oblique direction R. In each case, at the end of the feeding stroke, the locking point or projection 14 or 14c engages the rack teeth of the slide magazine and prevents any tendency of the magazine to turn too far on account of its momentum. During the return stroke, the oblique edge of the feeding lug or pawl 4 or 4c ratchets over the pins 5, displacing the slider 3 or 3c laterally away from the pinion against the force of the spring 12 or 12c. No reverse motion of the pinion takes place, because at this time the pinion is fully meshed with the rack teeth 7 of the slide magazine, the magazine being held stationary by its inertia.

Figure 2:
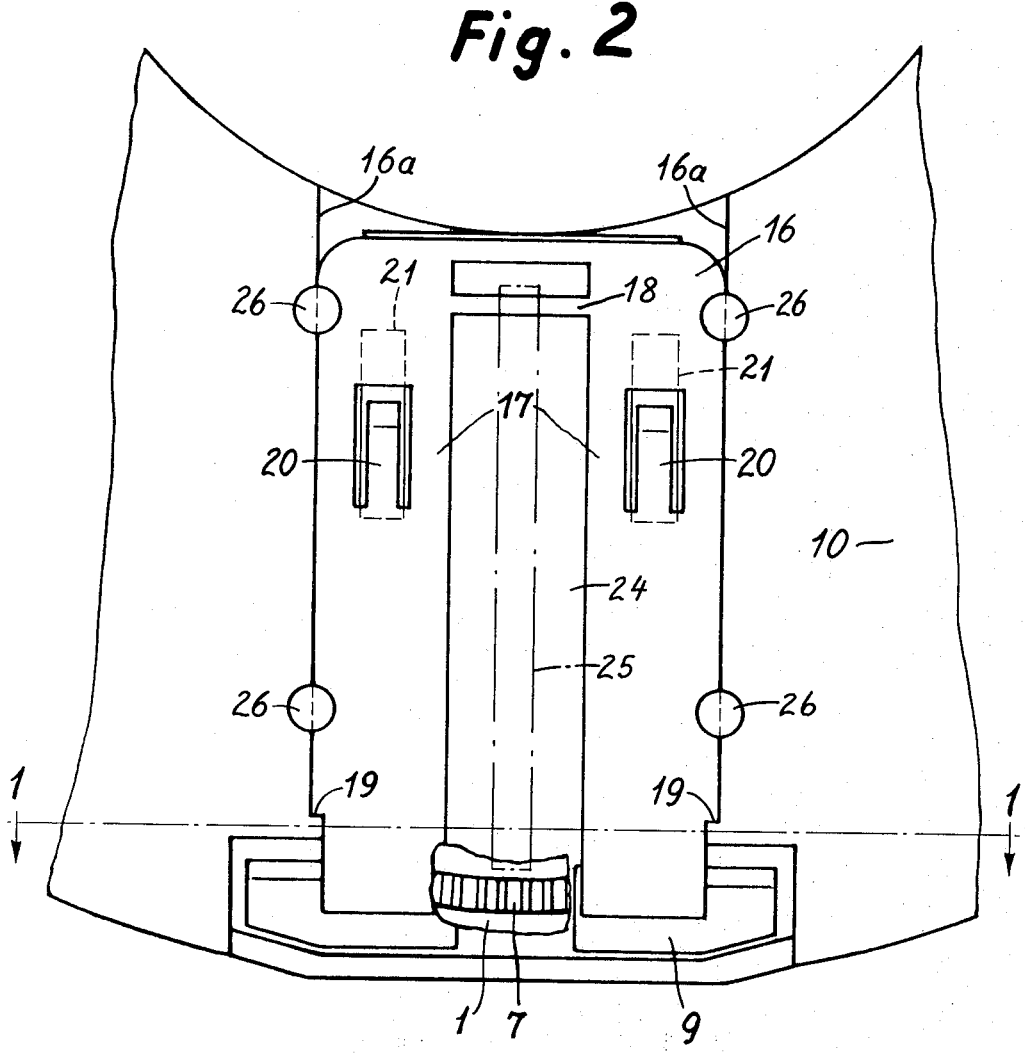
FIG. 2 is a fragmentary elevational view showing a portion of the side of the housing which faces toward the optical axis of the projector, and also illustrating a small fragment of the circular magazine with the feeding rack teeth thereon.

Reference is now made to FIG. 2, which shows mechanism used to prevent the picture slides from falling out of the magazine, through the slide transporting opening in the housing, while the housing and the magazine therein are being transported from place to place.

On that wall of the housing 10 which faces toward the optical axis of the projector, there is a retention gate in the form of a slider 16 of generally inverted U shape. It is made of a thin piece of metal sliding in the shallow vertical guideway or groove 16a formed in the face of the wall of the housing 10. The two side legs 17 of the slider straddle an opening 24 in the side wall of the housing, through which opening a picture slide, shown schematically at 25, may be inserted or withdrawn.

The retention gate or slide 16 is held in its groove 16a by enlarged heads on fixed guide studs 26, which overlie the edges of the legs 17 of the gate, as shown. Near their bottom ends, the legs 17 are of reduced width, forming shoulders 19 which come into contact with corresponding fixed shoulders on the wall of the housing 10. This limits the motion of the gate 16, 17 in a vertically downward direction. Resilient tongues 20, formed integrally with the legs 17, press rearwardly into shallow grooves 21 formed in the underlying wall of the housing 10. Vertically upward motion of the slider 16, 17 is limited by contact of the upper ends of the tongues 20 with the ends of the recesses 21. The tongues also serve to prevent chattering of the slider, since they press rearwardly on the fixed wall of the housing 10 and react forwardly on the legs 17, holding the legs tightly against the undersides of the enlarged heads on the retaining studs 26.

When the retention gate 16, 17 is in its lowest position, illustrated in FIG. 2, the upper portion 18 thereof lies slightly below the upper end of a picture slide 25, and prevents the slide from accidentally falling out through the opening 24, while the magazine and its housing are being transported from place to place. When the housing containing the magazine is inserted by a downward motion into the magazine guideway or trough of the projector, a fixed part at the side of the trough engages the lower ends of the legs 17 and pushes them upwardly a little, so that the portion 18 becomes raised above the top edge of the picture slide 25, and the slide transporting or changing mechanism is able to move the slide edgewise horizontally, through the narrow unrestricted opening 24, from the magazine into the projector, or from the projector back into the magazine. When the magazine and its housing are removed from the projector, the operator manually moves the slide back downwardly to the blocking or retention position.

It has been mentioned above that the magazine feeding claw or gripper 2 moves obliquely in the direction V or the direction R (FIG. 1) depending upon the desired direction of feed of the magazine. One satisfactory mechanism for producing the oblique motion of the claw 2 is illustrated schematically in FIG. 3, to which reference is now made.

Figure 3:
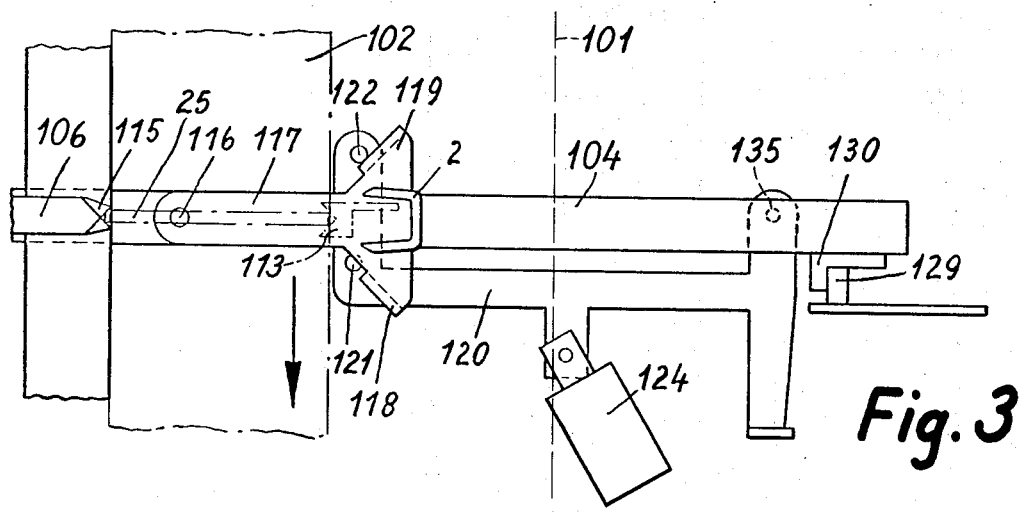
FIG. 3 is a schematic view illustrating the feeding mechanism mounted on the projector for feeding a bar magazine, and also illustrating portions of the transfer mechanism for transferring a picture slide from the magazine to the optical axis of the projector.

A magazine of the conventional bar or straight type is shown schematically at 102 in FIG. 3. At an elevation below the bottom of the magazine, is the reciprocating bar 104, reciprocated back and forth by any suitable mechanism, such as a crank pin 129 engaging a groove in an upstanding member 130 fixed to the reciprocating bar 104.

Pivoted on the reciprocating bar at 116 is a lever 117 which extends rightwardly from the pivot (when viewed as in FIG. 3) and which has an enlarged head at its right end. The head has a downwardly bent flange 118 lying at approximately 45 degrees clockwise from the axis of the bar 104, and a downwardly bent flange 119 lying at approximately 45° counterclockwise from the axis of the bar 104. The claw or gripper 2 is upstanding from and carried by the enlarged head of the lever 117.

Carried by a fixed pivot 135 in the projector is a lever 120 which has two upstanding pins 121 and 122 for cooperating respectively with the inclined ears or flanges 118 and 119, respectively, of the lever 117.

The lever 120 may be swung slightly on its pivot 135 by any convenient operating means 124, such as an electric solenoid. When the lever 120 and its pins 121 and 122 are in the position illustrated in FIG. 3, the pin 121 is out of alignment with the down turned ear or lug 118, but the pin 122 is in alignment with the down turned ear 119. The result is that when the feeding bar 104 makes its outward stroke, outwardly from the optical axis 101 (that is, leftwardly when viewed as in FIG. 3) the oblique ear 119 will be deflected or cammed by the stationary pin 122, so that the right end of the lever 117 will be swung slightly clockwise on its pivot 116. Since the feeding claw or gripper 2 is mounted on the right end of the lever 117, the claw will move obliquely, not only leftwardly when viewed as in FIG. 3, but also downwardly in this view thus producing the oblique motion in the direction of the arrow R as described in connection with FIG. 1. A light restoring spring (not shown) may be used to swing the lever 117 back to its central position, during the rightward stroke of the bar 104.

If the lever 120 is swung slightly counterclockwise on its pivot 135, from the position shown in FIG. 3, then the pin 121 will be aligned with the inclined ear 118, and the pin 122 will be out of alignment with the ear 119. Thus when the bar 104 moves leftwardly (viewed as in FIG. 3) the ear 118 will engage with the stationary pin 121, and the continuing leftward motion of the bar 104 will swing the lever 117 slightly counterclockwise on its pivot 116, so that the claw 2 will move obliquely toward the magazine, in the direction of the arrow V in FIG. 1.

If at this time the projector is loaded with a straight or bar magazine 102, the feeding claw 2, as it comes obliquely toward the magazine, will engage the rack teeth on the magazine and give the magazine an increment of feeding motion in one direction or the other, depending upon the position of the control lever 120. If, however, the projector is at this time loaded with a circular or ring shaped magazine, as described above in connection with FIGS. 1 and 2, then the feeding claw 2 will not come into contact with any rack teeth on the magazine, but will come into contact with one or the other of the flanges 9 and 9c on the respective sliders 3 and 3c, thus operating the feeding pinion 6 in the manner above described, and the feeding pinion, being in mesh with the rack teeth on the circular magazine, will impart to the magazine an increment of rotary feeding motion in one direction or the other.

In addition to carrying the lever 117 on which the claw 2 is mounted, the bar 104 also carries the picture slide clamping parts for engaging the vertical edges of a picture slide 25, to transport the slide from the magazine to the optical axis 101, and then back from the optical axis to the magazine after the image of the slide has been sufficiently viewed. Such slide clamping parts for transporting the picture slide are well understood in the art, and may include for example an upstanding abutment 106 mounted in fixed relation to the bar 104 at the outer end thereof, for engaging the outer vertical edge of the slide, and another abutment 113 mounted on the bar 104 in a resilient manner and resiliently engaging the inner vertical edge of the picture slide 25; that is, the edge closer to the optical axis 101.

What is claimed is:

1. Slide projector magazine feeding mechanism for feeding two different types of slide magazines having two different arrangements of rack teeth thereon, said feeding mechanism comprising:
   a. a feeding claw movable obliquely with respect to the direction in which a magazine of a first type is to be fed;
   b. said claw during its oblique movement in one direction engaging directly with rack teeth on said first type magazine and thereby causing feeding movement of such magazine;
   c. a toothed pinion having gear teeth meshing directly with rack teeth on a magazine of a second type, to cause feeding movement of such magazine upon rotation of said pinion; and
   d. transmission means engaged and moved by said feeding claw when no magazine of the first type is present, for turning said pinion in response to movement of said feeding claw, thereby to cause feeding movement of a magazine of the second type.

2. Mechanism as defined in claim 1, wherein said transmission means comprises a transmission slider having a first surface to be engaged by said oblique movement of said feeding claw, to be moved thereby in a first direction, and having a second surface engaging said pinion when said slider is moved in said first direction, thereby to turn said pinion, and spring means tending to move said slider reversely in a second direction.

3. Mechanism as defined in claim 2, wherein said transmission slider has a pointed portion for engaging the rack teeth on a magazine of the second type near the end of a feeding movement of said slider, to stop movement of the magazine and prevent overrunning thereof.

4. Mechanism as defined in claim 1, further comprising a slide projector body having a guideway for receiving a slide magazine of the first type, said feeding claw being mounted on and movable with respect to said projector body.

5. Mechanism as defined in claim 4, further comprising a housing detachably receivable in said guideway, said housing containing said magazine of the second type, said pinion and said transmission means being mounted in said housing.

6. Mechanism as defined in claim 5, wherein said magazine of the second type is of circular ring-like shape and said magazine of the first type is of straight bar type.

7. Mechanism as defined in claim 1, wherein said feeding claw is selectively movable obliquely in either one of two oblique directions at a substantial angle to each other, one direction being for feeding a magazine forwardly and the other direction being for feeding a magazine reversely, and wherein said transmission means comprises two transmission sliders, both movable in a general direction transversely to the direction of feeding movement of the magazine, the first transmission slider having a first surface in the path of travel of the forwardly feeding oblique movement of said feeding claw, to be engaged and moved thereby, and a second surface engaging said pinion to turn said pinion in a forward feeding direction when said first slider is moved by said feeding claw, said first slider being out of the path of travel of said feeding claw during its reversely feeding oblique movement, the second transmission slider having a first surface in the path of travel of the reversely feeding oblique movement of said feeding claw, to be engaged and moved thereby, and a second surface engaging said pinion to turn said pinion in a reverse feeding direction when said second slider is moved by said feeding claw, said second slider being out of the path of travel of said feeding claw during its forwardly feeding oblique movement.

* * * * *